United States Patent [19]

Vinciguerra

[11] 4,039,232
[45] Aug. 2, 1977

[54] SHAFT AND BUSHING ASSEMBLY

[75] Inventor: Costantino Vinciguerra, Florence, Italy

[73] Assignee: Nuovo Pignone, S.p.A., Florence, Italy

[21] Appl. No.: 647,783

[22] Filed: Jan. 9, 1976

[30] Foreign Application Priority Data

Jan. 10, 1975 Italy .................................. 19162/75

[51] Int. Cl.² .............................................. F16C 1/24
[52] U.S. Cl. .................................. 308/36.1; 308/237 R
[58] Field of Search ................ 308/237 R, 237 A, 36.1

[56] References Cited

U.S. PATENT DOCUMENTS 3,481,277  12/1969  Pettibone ........................ 308/237 R
3,637,269  1/1972   Lantry ............................ 308/237 A Primary Examiner—Joseph F. Peters, Jr.
Assistant Examiner—Richard A. Bertsch
Attorney, Agent, or Firm—Ralph M. Watson

[57] ABSTRACT

The invention relates to a bushing system, particularly adapted for the use in dusty environments, and suitable for journalling pins, shafts and the like, so as to permit them to be rotated but not to be axially displaced, comprising a supporting hollow body, rotatably receiving in the inside thereof the pin, shaft or the like, and two spaced guide bushings, made of plastic material; the two bushings are axially pressed against end collars on said pin, shaft or the like, by means of a helical spring mounted between said bushings, the spring force being selected to be higher than the yield load of the plastic material forming said bushings.

2 Claims, 1 Drawing Figure

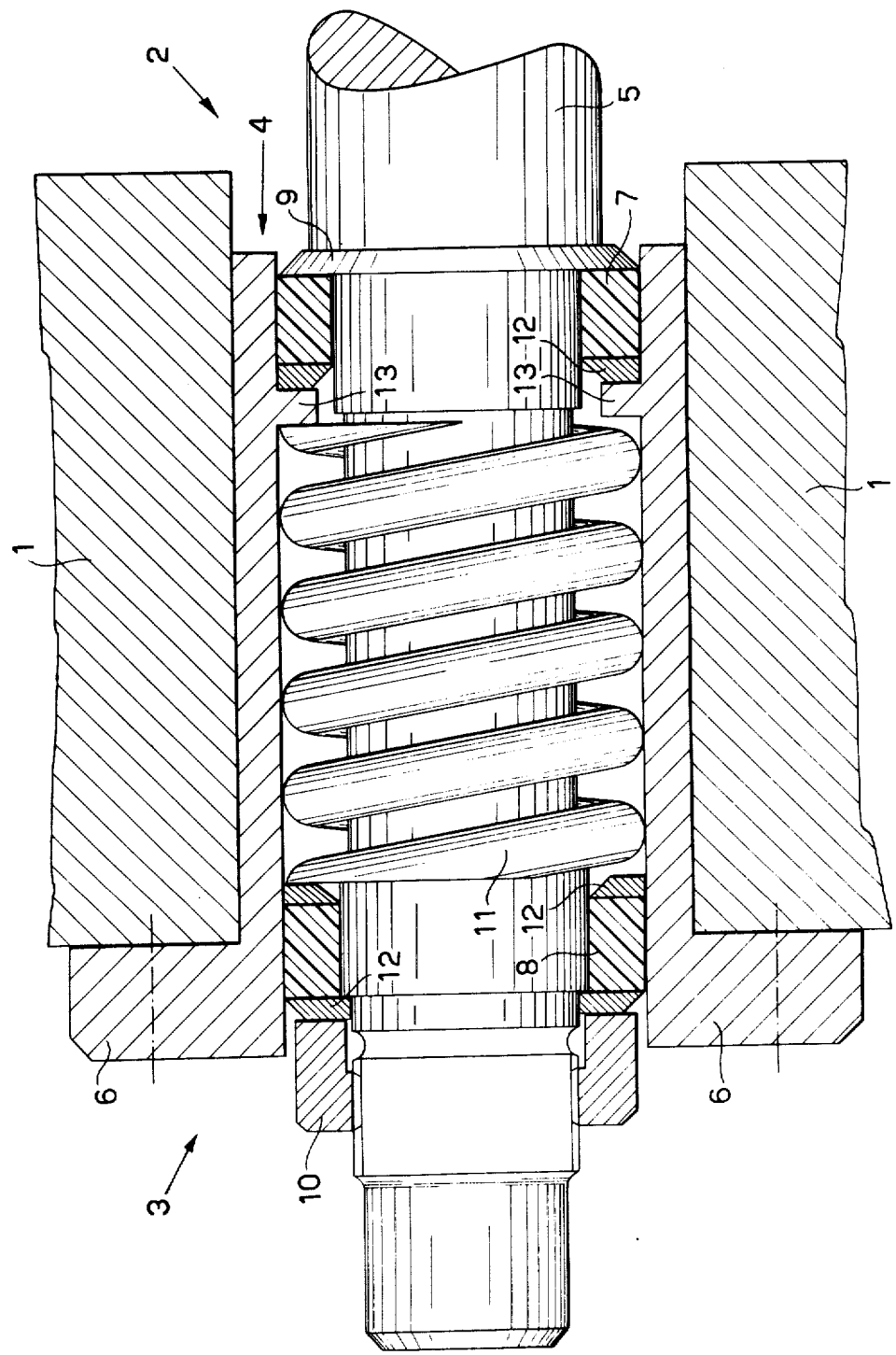

SHAFT AND BUSHING ASSEMBLY

The present invention relates to an economical functional bushing system having zero clearance suitable to support tightly in a rotatable but not translational way pins, shafts and like, when working in a pulverulent ambience.

In the prior art, in order to support in a rotatable but not translational way pins or shafts, guide bushings for the rotation are usually used, which are made of plastic material, such as nylon, teflon, etc., whereas the axial shifting is blocked with by other shoulder bushings.

Such a support system can not be utilized in a pulverulent ambience, where the dusts, by entering into the clearances existing between pin and bushing, progressively increase the friction so as to block totally said pin.

In order to obviate the afore said drawbacks various systems are presently used which include the pressurization with inert gases of the bushing clearances and the adoption of seal packings at the extremities of the same bushings.

Therefore these systems are complex, subject to wear and are very expensive.

According to another solution, elastic support systems are adopted which, by eliminating the bushings and the small clearances associated with them, make it possible to eliminate totally the causes of the undesired gripping, but said systems present the drawback of limiting the rotation of the pins to small angular values, besides being very expensive.

The object of the present invention is to provide a new bushings support system which do not present the drawbacks of the known systems which, besides to be functional, is simple and economical and guarantees the rotation without limitations of the supported pin in a pulverulent ambience and, at the same time, blocks the axial shifting of said pin.

According to a feature of the present invention said bushings support system of a pin or shaft is constituted by a hollow body supporting the bushings inside which said pin or shaft is rotatably supported by two spaced guide bushings, made from plastic material, which are axially compressed against terminal collars on said pin or shaft by means of a helical spring interposed between said bushings and this spring exerts on them a pressure higher than the yield load of the plastic material from which said bushings are made.

In such a way, being urged in an axial direction by means of said spring with a force higher than their yield limit, but lower than their extrusion limit, the plastic material bushings are plastically deformed until they fill up totally the annular housing in which they are located.

Therefore they cause a zero clearance and eliminate all the clearances either with the support body of the bushings or with the pin or shaft or with said terminal collars on of the pin or shaft, so as to totally prevent the inlet of dusts or other materials contained in the ambience in which the bushings work, which could cause the gripping of the pin or shaft rotating in that ambience.

On the other hand the adoption in the system of a "zero clearance" involves other advantages such as the possibility of reducing to a very small fraction the guide surface of the bushings with subsequent reduction of material, the obtaining of a high value of the dumping factor of the system in regard to vibrations generated by beating charges on the shaft or pin supported by the bushings, such as those which occur in an uranium enrichment plant when the blades are dipped in uranium hexaflouride gas in turbulent movement, and also the constancy in the course of time of the couple necessary to rotate the supported pin or shaft, since the friction between pin and bushings remains constant.

Finally, the presence in the system according to the invention of said helical spring makes the system elastic so that it is not affected by possible structural modifications of the plastic bushings due to thermal modifications or to reactions with the ambience because those are all absorbed by said spring.

According to another feature of the invention said hollow body supporting the bushings has an inner projecting shoulder between one of said guide bushings of the system and said helical spring so that these bear against the opposite faces of said projecting shoulder.

In such a way the pin or shaft supported by said guide bushings is only allowed to rotate around its axis with no axial shifting.

In fact, the axial shifting of the pin or shaft in one direction is prevented by the fact that a guide bushing is in contact with said projecting shoulder of the bushing support body, whereas in the opposite axial direction, shifting is opposed by the force exerted by said helical spring which bears against said projecting shoulder.

According to another feature of the invention each guide bushing is situated between metallic shoulder washers which prevent the extrusion of the material of which said bushings are made.

The invention will now be further explained with reference to the accompanying drawing.

BRIEF DESCRIPTION OF THE DRAWING

The drawing is an elevation, partially in section, of a supported bushing embodying my invention.

In the drawing, 1 indicates a wall separating two zones, 2 and 3, and having an opening 4 in which a pin or shaft 5 is tightly supported for rotational but not translational movement.

For this purpose, a bushing support provided by hollow body 6 is inserted in said opening 4 and locked on wall 1 by means of screws or other means (not shown), the pin or shaft 5 being rotatably supported inside said body by two guide bushings 7 and 8 made of plastic material (e.g. teflon).

The guide bushings 7 and 8 are axially pressed respectively against a fixed collar 9 of the pin or shaft 5 and against a movable stop nut 10 screwed on said pin or shaft 5, by means of a helical spring 11 which, interposed between the bushings, is compressed through the action of said movable nut 10 to the point where it does not exert on said bushings a pressure higher than the yield load of the plastic material from which the bushings are made.

These bushings are plastically deformed, thus closing any clearance existing between them and the hollow body 6, the shaft or pin 5 and collars 9 and 10.

In order to prevent extrusion phenomenon, metallic shoulder washers 12 are employed.

Finally, to maintain the pin or shaft 5 in position and to prevent axial movement thereof, the hollow body 6 is provided with an inwardly projecting shoulder 13, one side of which acts as a stop for one extremity of the helical spring 11, whereas the other opposite side acts as a shoulder for the bushing 7.

In such a way in fact as shown in the drawing, the pin or shaft 5 cannot move towards the left because of the fact that the bushing 7 is already compressed by spring 11 against the projecting shoulder 13 by means of the fixed collar 9, whereas a shifting towards the right of the pin or shaft 5 is not possible because of the opposite action exerted by spring 11 bearing against said projecting shoulder 13.

I claim:

1. The combination of a shaft and a dustproof bushing assembly adapted to support said shaft for rotation about its axis and to prevent longitudinal movement thereof which comprises, a bushing support cylinder, an annular shoulder projecting from the bore of said bushing support cylinder near its inner end, a collar fixed to said shaft and contained within the bushing support cylinder between the inner end thereof and said annular shoulder, a first annular bearing of an elastically deformable material supported by said cylinder and mounted on said shaft between said collar and said annular shoulder, a longitudinally adjustable stop nut mounted on said shaft adjacent its outer end, a helical spring surrounding said shaft and having its inner end bearing against said annular shoulder, a second annular bearing of an elastically deformable material supported by said cylinder and mounted on said shaft between said stop nut and the outer end of said helical spring so that the spring causes said second annular bearing to be compressed against the stop nut and causes the said first annular bearing to be compressed between said collar and said annular shoulder, the tension of said spring being adjusted by said stop nut so as to exert a pressure on said elastically deformable annular bearings in excess of the yield load thereof.

2. The combination of a shaft and a dustproof bushing assembly as claimed in claim 1, and including a first annular metallic washer between said stop nut and said second annular bearing, a second annular metallic washer between said second annular bearing and said helical spring, and a third annular metallic washer between said annular shoulder and said first annular bearing.

* * * * *